United States Patent
Roh et al.

(10) Patent No.: US 11,699,063 B2
(45) Date of Patent: Jul. 11, 2023

(54) PARTIAL INFERENCE PATH TECHNOLOGY IN GENERAL OBJECT DETECTION NETWORKS FOR EFFICIENT VIDEO PROCESSING

(71) Applicant: Intel Corporation, Santa Clara, CA (US)

(72) Inventors: Byungseok Roh, Seoul (KR); Hyunjoon Lee, Seoul (KR); Seok-Yong Byun, Seoul (KR); Minje Park, Seongnam (KR)

(73) Assignee: Intel Corporation, Santa Clara, CA (US)

( * ) Notice: Subject to any disclaimer, the term of this patent is extended or adjusted under 35 U.S.C. 154(b) by 1141 days.

(21) Appl. No.: 16/284,186

(22) Filed: Feb. 25, 2019

(65) Prior Publication Data

US 2019/0188555 A1    Jun. 20, 2019

(51) Int. Cl.
*G06N 3/04* (2023.01)
*G06N 3/082* (2023.01)
*G06V 10/25* (2022.01)
*G06V 20/40* (2022.01)
*G06V 40/10* (2022.01)
*G06V 10/764* (2022.01)
*G06F 18/24* (2023.01)
(Continued)

(52) U.S. Cl.
CPC .............. *G06N 3/04* (2013.01); *G06F 18/24* (2023.01); *G06F 18/2413* (2023.01); *G06N 3/082* (2013.01); *G06V 10/25* (2022.01); *G06V 10/764* (2022.01); *G06V 20/46* (2022.01); *G06V 40/103* (2022.01); *G06N 5/045* (2013.01)

(58) Field of Classification Search
CPC .......... G06N 3/02; G06N 3/04; G06N 3/0436; G06N 3/0445; G06N 3/0454; G06N 3/08; G06N 3/082; G06N 5/04; G06N 5/045; G06N 5/046; G06N 5/047; G06N 5/048; G06N 20/00; G06N 20/10; G06N 20/20; G06N 7/02; G06K 9/6267; G06K 9/627; G06V 10/25; G06V 10/70; G06V 10/764; G06V 10/765; G06V 20/46; G06V 40/103; G06F 18/24; G06F 18/2413
See application file for complete search history.

(56) References Cited

U.S. PATENT DOCUMENTS

| | | | | |
|---|---|---|---|---|
| 10,460,175 | B1* | 10/2019 | Gould | G06F 18/22 |
| 2018/0188045 | A1* | 7/2018 | Wheeler | H04L 67/52 |
| 2019/0361454 | A1* | 11/2019 | Zeng | G05D 1/0214 |

OTHER PUBLICATIONS

Hong et al., "PVA Net: Lightweight Deep Neural Networks for Real-time Object Detection", The 1st International Workshop on Efficient Methods for deep Neural Networks, Dec. 9, 2016, 7 pages.
(Continued)

*Primary Examiner* — Shane D Woolwine
(74) *Attorney, Agent, or Firm* — Jordan IP Law, LLC (57) ABSTRACT

Systems, apparatuses and methods may provide for technology that generates, by a full inference path of a neural network, a first detection result associated with one or more objects in a first video frame. The technology may also generate, by a partial inference path of the neural network, a second detection result based on the first detection result, wherein the second detection result corresponds to a second video frame that is subsequent to the first video frame.

25 Claims, 4 Drawing Sheets

(51) Int. Cl.
    *G06F 18/2413*    (2023.01)
    *G06N 5/045*    (2023.01)

(56) References Cited

OTHER PUBLICATIONS

Liu et al., "SSD: Single Shot Multibox Detector", Proceedings of the European Conference on Computer Vision (ECCV), Dec. 29, 2016, 17 pages.

Ren et al., "Faster R-CNN: Towards Real-Time Object Detection with Region Proposal Networks", IEEE Transactions on Pattern Analysis and Machine Intelligence, Jan. 6, 2016, 14 pages.

\* cited by examiner

PARTIAL INFERENCE PATH TECHNOLOGY IN GENERAL OBJECT DETECTION NETWORKS FOR EFFICIENT VIDEO PROCESSING

TECHNICAL FIELD

Embodiments generally relate to machine learning technology. More particularly, embodiments relate to partial inference path technology in general object detection networks for efficient video processing.

BACKGROUND

Although machine learning (e.g., deep neural network/ DNN frameworks) may be used in computer vision applications to detect, classify and track objects in video signals, there remains considerable room for improvement. For example, the computation costs of a DNN such as, for example, the Faster R-CNN (Region Convolutional Neural Network) may be relatively high with respect to object tracking. Moreover, the higher computation costs may lead to increased latency, reduced performance/efficiency and/or increased power consumption. Alternatively, the use of object-agnostic trackers may result in tracking costs that exceed detection costs when the number of objects to be tracked is relatively high. Another drawback of object-agnostic trackers may be quality (e.g., drifting, ghosting) issues that are challenging to resolve.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
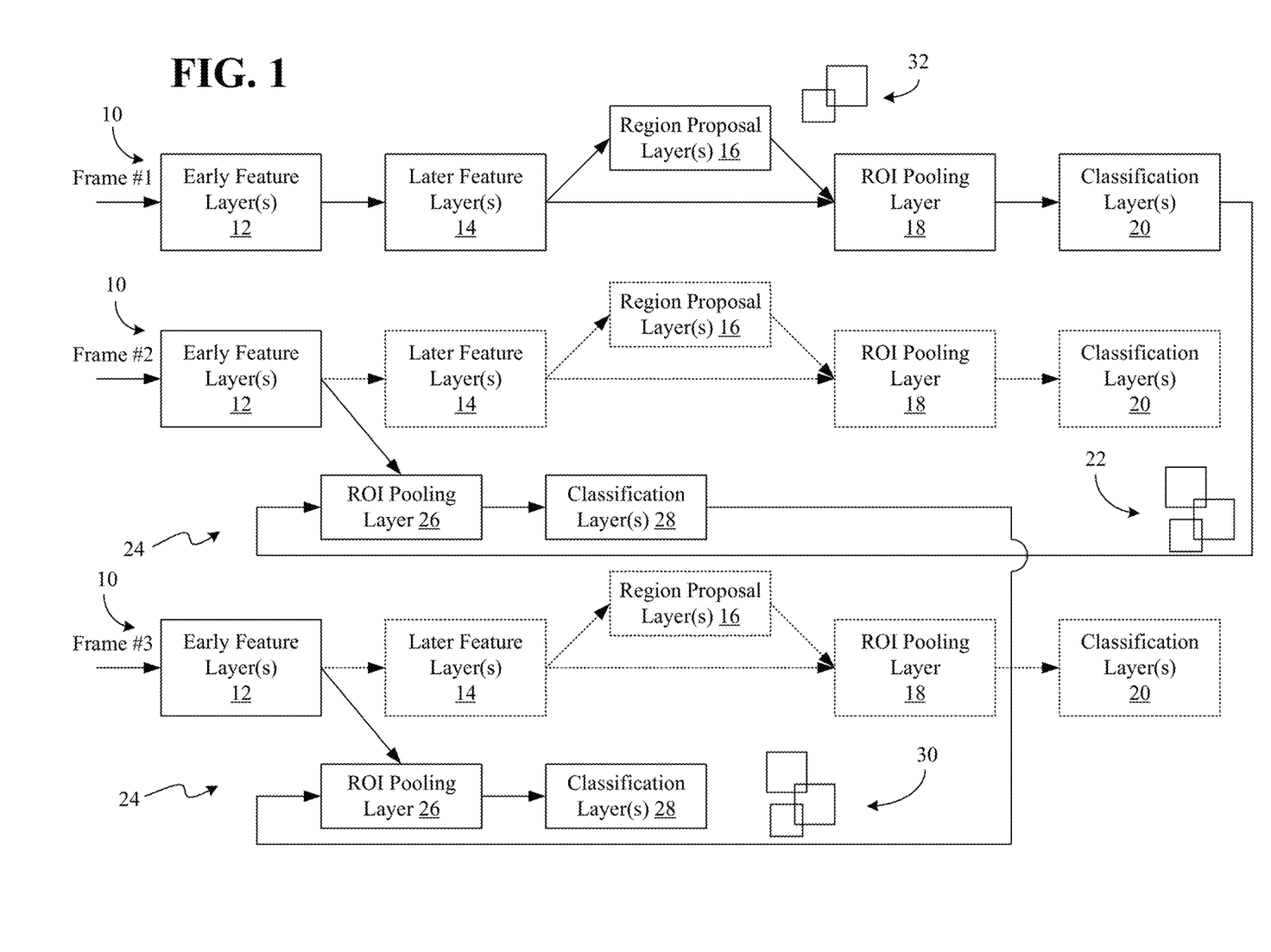
FIG. 1 is a block diagram of an example of an object detection sequence that applies a partial inference path of a neural network to subsequent video frames according to an embodiment.

Turning now to FIG. 1, an object detection sequence is shown for a plurality of frames (e.g., "Frame #1," "Frame #2," "Frame #3," etc.) of a video signal. The video signal might be associated with, for example, a sensor (e.g., camera, depth sensor, light detection and ranging/LiDAR sensor) of an autonomous vehicle, robot, drone, etc., that uses computer vision to automatically detect, classify and track (e.g., from frame-to-frame) objects in the video signal.

In the illustrated example, a first video frame (Frame #1) is input to a full inference path 10 of a neural network (e.g., DNN, CNN), wherein the full inference path 10 includes one or more early feature layers 12, one or more later feature layers 14, one or more region proposal layers 16, a region of interest (ROI) pooling layer 18, and one or more classification layers 20. In an embodiment, the full inference path 10 generates a first detection result 22 (e.g., object class bounding boxes) associated with one or more objects in the first video frame. Thus, the first detection result 22 may be used to initially locate and classify objects in the first video frame.

By contrast, the first detection result 22 and a second video frame (Frame #2, which is temporally subsequent to Frame #1) are input to a partial inference path 24 of the neural network, wherein the partial inference path 24 includes only the early feature layer(s) 12, an ROI pooling layer 26 and one or more classification layers 28. In the illustrated example, the partial inference path 24 generates a second detection result 30 (e.g., "objectness" bounding boxes that represent the probability of any class of object being present within the bounding box) based on the first detection result 22. As long as there is temporal and spatial coherence between the first video frame and the second video frame, the second detection result 30 may be used to track objects previously detected in the first video frame without incurring the computational overhead associated with initially detecting and classifying the objects. The lower computation costs may lead to decreased latency, enhanced performance/efficiency and/or decreased power consumption (e.g., longer battery life), even when the number of objects to be tracked is relatively high. Indeed, unexpectedly positive results have included a reduction in computation costs from 17.8 GMAC (giga multiply-accumulates) to 6.28 GMAC in an architecture including one full path traversal and nine partial path traversals over a ten-frame sequence, while detection accuracy only dropped from 83.52% mAP (mean average precision) to 82.91% mAP.

In the illustrated example, the second detection result 30 and a third video frame (Frame #3, which is temporally subsequent to Frame #2) are input to the partial inference path 24, wherein the partial inference path 24 generates a third detection result (e.g., objectness bounding boxes, not shown) based on the second detection result 30. In an embodiment, the third detection result is input to the partial inference path 24 along with a fourth video frame (not shown), and so forth. Usage of the partial inference path 24 may be repeated until a tunable threshold (e.g., k) is reached. At such time, the next video frame is input to the full inference path 10 to ensure that new objects are accurately detected and classified by the neural network. Such an approach enables image quality issues such as drifting and/or ghosting issues to be avoided.

In one example, the early feature layer(s) 12 are the initial portion of a feature generation network (FGN) that outputs an initial set of features (e.g., representing spatial information) based on the input video frames. The later feature layer(s) 14 of the full inference path 10 are a secondary portion of the FGN that outputs another set of features (e.g., representing semantic and contextual information) based on the initial set of features. In an embodiment, the region proposal layer(s) 16 generate a plurality of object proposals 32 based on the output of the later feature layer(s) 14 (e.g., later feature generation). Additionally, the illustrated ROI pooling layer 18 conducts an ROI pooling based on the output of the later feature generation and the plurality of object proposals 32, wherein the first detection result 22 is generated by the classification layer(s) 20 based on the ROI pooling. More particularly, the classification layer(s) 20 may classify the object category and regress the final bounding box of each object proposal independently with the pooled feature from the FGN.

By contrast, the ROI pooling layer 26 of the partial inference path 24 conducts ROI pooling based on the first detection result 22 and the output of the early feature layer(s) 12 (e.g., early feature generation), which is sufficient for the classification layer(s) 28 to generate the second detection result 30. In one embodiment, the early feature layer(s) 12 constitute no more than 30% of the FGN. Moreover, an average number of candidates in the illustrated solution may be an order of magnitude lower than the output of the region proposal layer(s) 16 because the partial inference path 24 only uses the first detection result 22, while the plurality of object proposals 32 includes the top-N boxes (e.g., 300 boxes). The impact on run-time performance is significant because all candidates are typically computed by the classification layer(s) 20 (e.g., classification network/CN). In addition, the output of the classification layer(s) 20 may include boxes with class types, whereas the region proposal layer(s) 16 may generate boxes only.

Figure 2:
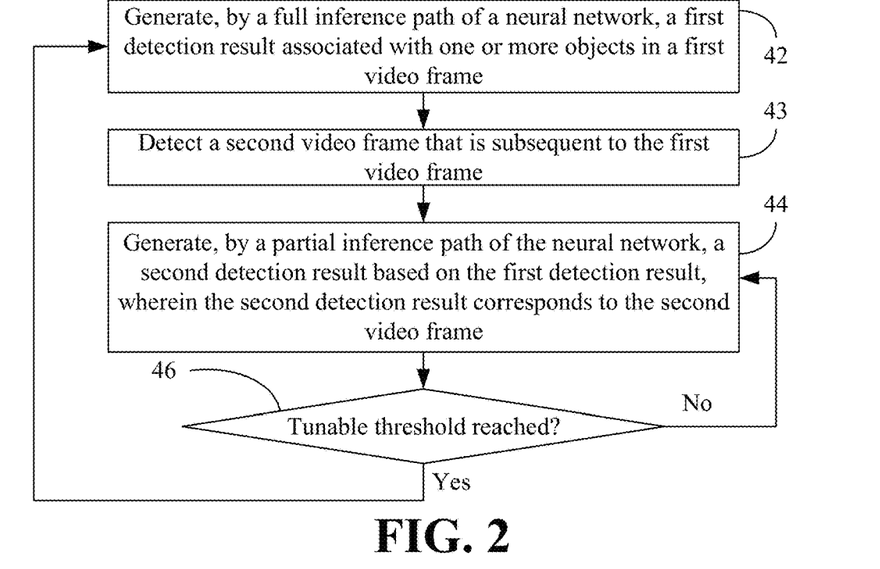
FIG. 2 is a flowchart of an example of a method of operating a computing system according to an embodiment.

FIG. 2 shows a method 40 of operating a computing system. The method 40 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 40 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 42 provides for generating, by a full inference path of a neural network, a first detection result associated with one or more objects in a first video frame. In an embodiment, the full inference path is similar to the full inference path 10 (FIG. 1), already discussed, and the first detection result includes one or more object class bounding boxes. The first detection result may therefore be considered an initial estimate of the position and context of the objects in the first video frame. Block 43 detects a second video frame that is subsequent (e.g., temporally) to the first video frame and block 44 generates, by a partial inference path of the neural network, a second detection result based on the first detection result. In the illustrated example, wherein the second detection result corresponds to the second video frame that is subsequent to the first video frame. In an embodiment, the partial inference path is similar to the partial inference path 24 (FIG. 1), already discussed, and the second detection result includes one or more objectness bounding boxes, which represent the probability of any class of object being present within the bounding box. More particularly, the objectness score estimation enables non-object boxes to be rejected. Accordingly, the accuracy of the partial inference path is increased and a non-maximum suppression (NMS) process is more able to eliminate overlapped bounding boxes. Simply put, the objectness estimation described herein may enable bounding boxes to be removed when the object is occluded or has disappeared.

A determination may be made at block 46 as to whether a tunable threshold (e.g., k) has been reached. If not, the illustrated method 40 inputs the next frame to the partial inference path at block 44. If the tunable threshold has been reached, the method 40 inputs the next frame to the full inference path at block 42. The illustrated method 40 therefore leverages temporal and spatial coherence between video frames to track objects previously detected without incurring the computational overhead associated with initially detecting and classifying the objects. The lower computation costs may lead to decreased latency, enhanced performance/efficiency and/or decreased power consumption (e.g., longer battery life), even when the number of objects to be tracked is relatively high. Additionally, the method 40 enables tracking quality issues such as drifting and/or ghosting issues to be avoided.

Figure 3A:
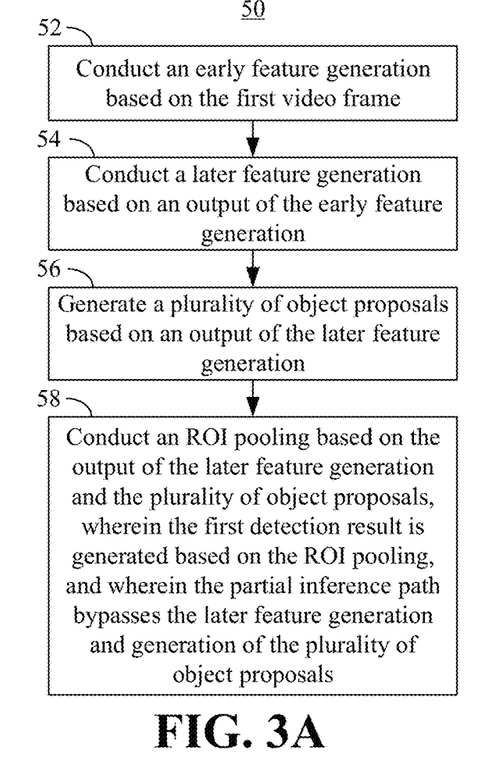
FIG. 3A is a flowchart of an example of a method of generating a first detection result according to an embodiment.

FIG. 3A shows a method 50 of generating a first detection result. The method 50 may generally be substituted for block 42 (FIG. 2), already discussed. More particularly, the method 50 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 52 conducts an early feature generation based on a first video frame. In an embodiment, the output of the early feature generation represents spatial information in the first video frame. A later feature generation may be conducted at block 54 based on the output of the early feature generation. In one example, the output of the later feature generation represents semantic and contextual information in the first video frame. Block 56 generates a plurality of object proposals based on the output of the later feature generation. Additionally, an ROI pooling may be conducted at block 58 based on the output of the later feature generation and the plurality of object proposals. In the illustrated example, a first detection result is generated based on the ROI pooling and the partial inference path bypasses the later feature generation and generation of the plurality of object proposals.

Figure 3B:
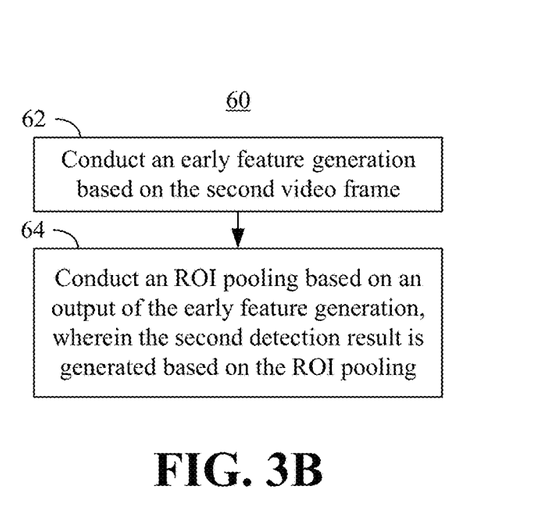
FIG. 3B is a flowchart of an example of a method of generating a second detection result according to an embodiment.

FIG. 3B shows a method 60 of generating a second detection result. The method 60 may generally be substituted for block 44 (FIG. 2), already discussed. More particularly, the method 60 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 62 conducts an early feature generation based on a second video frame. In an embodiment, the output of the early feature generation represents spatial information in the second video frame. An ROI pooling may be conducted at block 64 based on the output of the early feature generation, wherein a second detection result is generated based on the ROI pooling. As already noted, the partial inference path bypasses the later feature generation and generation of the plurality of object proposals associated with the full inference path.

Figure 4:
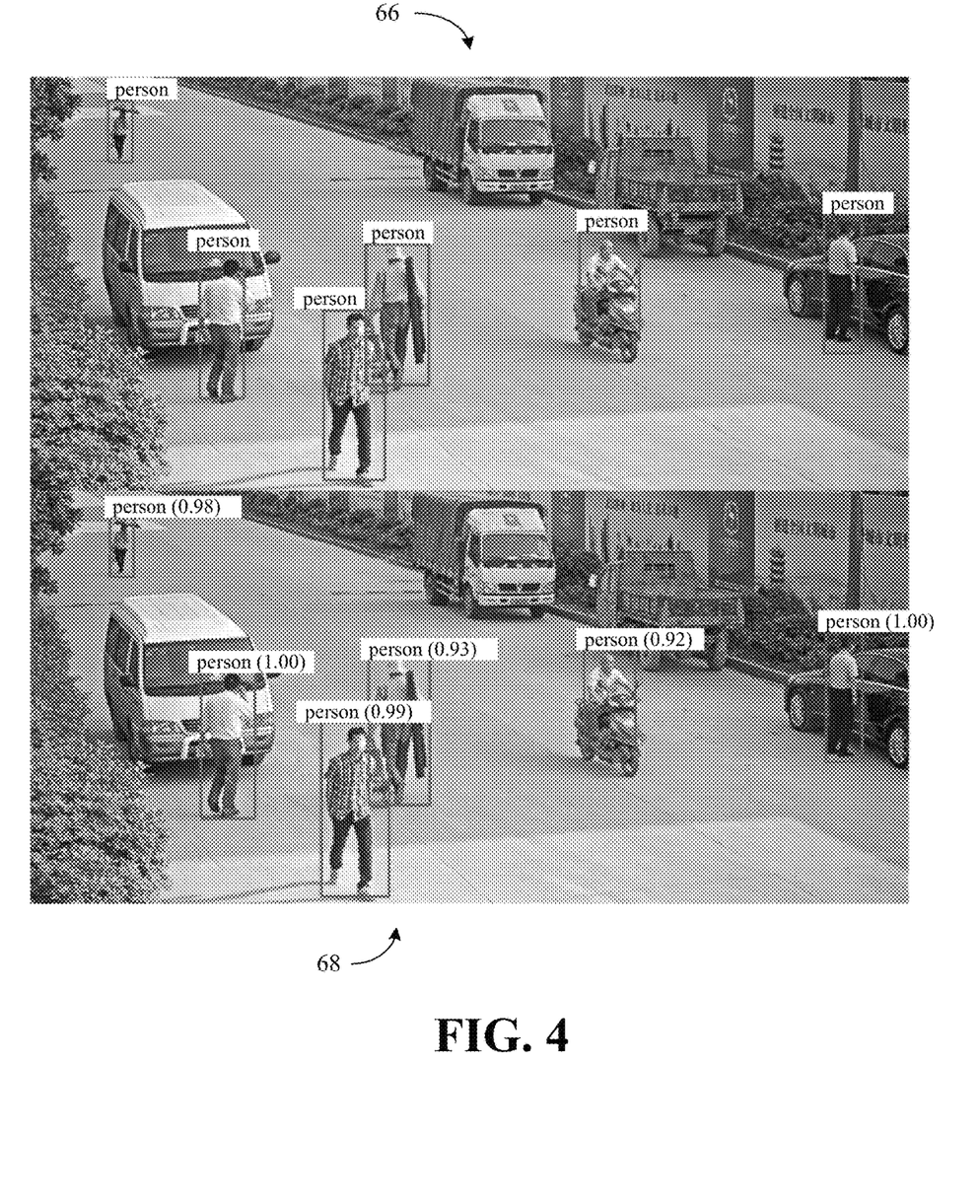
FIG. 4 is an illustration of an example of a first detection result and a second detection result according to an embodiment.

FIG. 4 shows a first detection result 66 that includes a plurality of object class bounding boxes drawn around objects that have been automatically detected and classified as people in a video frame. By contrast, a second detection result 68 (e.g., corresponding to a temporally subsequent video frame) includes a plurality of objectness bounding boxes. In the illustrated example, the objectness bounding boxes include probabilities. Other object classifications such as cycles, birds, buses, cars, cats, dogs, and so forth, may also be used.

Figure 5:
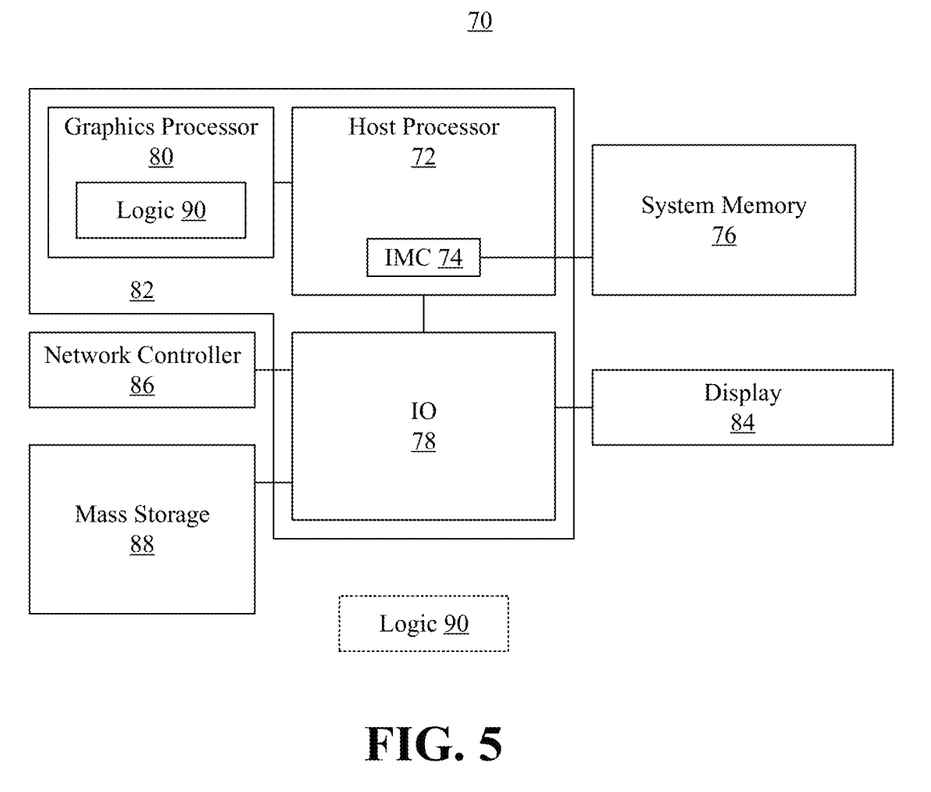
FIG. 5 is a block diagram of an example of a performance-enhanced computing system according to an embodiment.

Turning now to FIG. 5, a performance-enhanced computing system 70 is shown. The computing system 70 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), gaming functionality (e.g., networked multi-player console), aerial functionality (e.g., drone), robotic functionality, etc., or any combination thereof. In the illustrated example, the system 70 includes a host processor 72 (e.g., central processing unit/CPU) having an integrated memory controller (IMC) 74 that is coupled to a system memory 76.

The illustrated system 70 also includes an input output (10) module 78 implemented together with the processor 72 and a graphics processor 80 on a semiconductor die 82 as a system on chip (SoC). The illustrated IO module 78 communicates with, for example, a display 84 (e.g., touch screen, liquid crystal display/LCD, light emitting diode/LED display), a network controller 86 (e.g., wired and/or wireless), and mass storage 88 (e.g., hard disk drive/HDD, optical disk, solid state drive/SSD, flash memory). The network controller 86 may receive a video signal (e.g., including a first video frame, a second video frame, and so forth) from, for example, other remote and/or local computing platforms. In an embodiment, the graphics processor 80 includes logic 90 (e.g., configurable logic, fixed-functionality hardware logic, etc., or any combination thereof) to perform one or more aspects of the method 40 (FIG. 2), the method 50 (FIG. 3A) and/or the method 60 (FIG. 3B), already discussed.

Thus, the logic 90 may generate, by a full inference path of a neural network, a first detection result associated with one or more objects in the first video frame. In an embodiment, the logic 90 also generates, by a partial inference path of the neural network, a second detection result based on the first detection result, wherein the second detection result corresponds to the second video frame. The illustrated system 70 therefore leverages temporal and spatial coherence between video frames to track objects previously detected without incurring the computational overhead associated with initially detecting and classifying the objects. As already noted, the lower computation costs may lead to decreased latency, enhanced performance/efficiency and/or decreased power consumption (e.g., longer battery life), even when the number of objects to be tracked is relatively high. Additionally, the system 70 enables image quality issues such as drifting and/or ghosting issues to be avoided. Although the logic 90 is shown in the graphics processor 80, the logic may be located elsewhere in the computing system 70.

Figure 6:
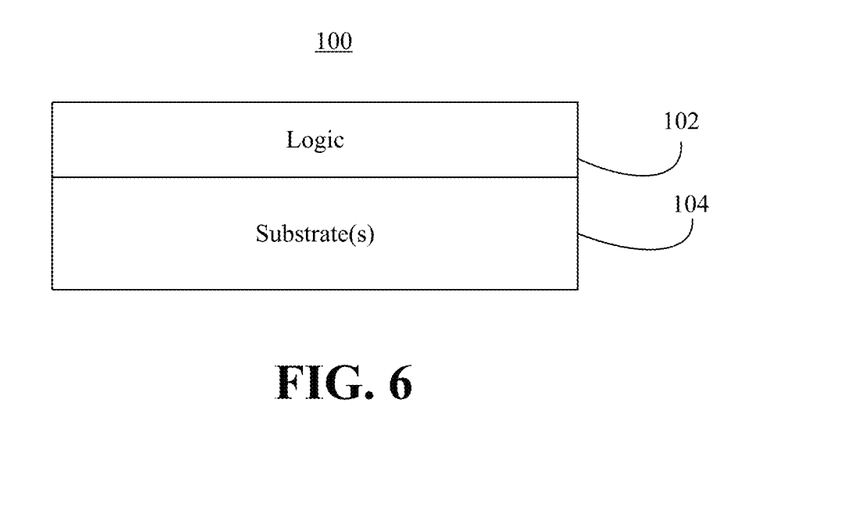
FIG. 6 is an illustration of an example of a semiconductor apparatus according to an embodiment.

FIG. 6 shows a semiconductor package apparatus 100. The illustrated apparatus 100 includes one or more substrates 104 (e.g., silicon, sapphire, gallium arsenide) and logic 102 (e.g., transistor array and other integrated circuit/IC components) coupled to the substrate(s) 104. The logic 102 may be implemented at least partly in configurable logic or fixed-functionality logic hardware. In one example, the logic 102 implements one or more aspects of the method 40 (FIG. 2), the method 50 (FIG. 3A) and/or the method 60 (FIG. 3B), already discussed. Thus, the logic 102 generates, by a full inference path of a neural network, a first detection result associated with one or more objects in a first video frame. In an embodiment, the logic 102 also generates, by a partial inference path of the neural network, a second detection result based on the first detection result, wherein the second detection result corresponds to a second video frame that is subsequent to the first video frame.

In one example, the logic 102 includes transistor channel regions that are positioned (e.g., embedded) within the substrate(s) 104. Thus, the interface between the logic 102 and the substrate(s) 104 may not be an abrupt junction. The logic 102 may also be considered to include an epitaxial layer that is grown on an initial wafer of the substrate(s) 104.

Additional Notes and Examples

Example 1 includes a performance-enhanced computing system comprising a network controller to receive a first video frame and a second video frame that is subsequent to the first video frame, a processor coupled to the network controller, and a memory coupled to the processor, wherein the memory includes a set of instructions, which when executed by the processor, cause the computing system to generate, by a full inference path of a neural network, a first detection result associated with one or more objects in the first video frame, detect the second video frame, and generate, by a partial inference path of the neural network, a second detection result based on the first detection result, wherein the second detection result corresponds to the second video frame.

Example 2 includes the computing system of Example 1, wherein the instructions, when executed, cause the computing system to conduct an early feature generation based on the second video frame, conduct a region of interest pooling based on an output of the early feature generation, wherein the second detection result is generated based on the region of interest pooling.

Example 3 includes the computing system of Example 1, wherein the second detection result is to include one or more objectness bounding boxes.

Example 4 includes the computing system of any one of Examples 1 to 3, wherein the instructions, when executed, cause the computing system to repeat generation of the second detection result for a tunable plurality of video frames that are subsequent to the first video frame.

Example 5 includes the computing system of Example 1, wherein the instructions, when executed, cause the computing system to conduct an early feature generation based on the first video frame, conduct a later feature generation based on an output of the early feature generation, generate a plurality of object proposals based on an output of the later feature generation, conduct a region of interest pooling based on the output of the later feature generation and the plurality of object proposals, wherein the first detection result is generated based on the region of interest pooling, and wherein the partial inference path bypasses the later feature generation and generation of the plurality of object proposals.

Example 6 includes the computing system of Example 1, wherein the first detection result is to include one or more object class bounding boxes.

Example 7 includes a semiconductor apparatus comprising one or more substrates, logic coupled to the one or more substrates, wherein the logic is implemented at least partly in one or more of configurable logic or fixed-functionality hardware logic, the logic coupled to the one or more substrates to generate, by a full inference path of a neural network, a first detection result associated with one or more objects in a first video frame, detect a second video frame that is subsequent to the first video frame, and generate, by a partial inference path of the neural network, a second detection result based on the first detection result, wherein the second detection result corresponds to the second video frame.

Example 8 includes the semiconductor apparatus of Example 7, wherein the logic coupled to the one or more substrates is to conduct an early feature generation based on the second video frame, conduct a region of interest pooling based on an output of the early feature generation, wherein the second detection result is generated based on the region of interest pooling.

Example 9 includes the semiconductor apparatus of Example 7, wherein the second detection result is to include one or more objectness bounding boxes.

Example 10 includes the semiconductor apparatus of any one of Examples 7 to 9, wherein the logic coupled to the one or more substrates is to repeat generation of the second detection result for a tunable plurality of video frames that are subsequent to the first video frame.

Example 11 includes the semiconductor apparatus of Example 7, wherein the logic coupled to the one or more substrates is to conduct an early feature generation based on the first video frame, conduct a later feature generation based on an output of the early feature generation, generate a plurality of object proposals based on an output of the later feature generation, conduct a region of interest pooling based on the output of the later feature generation and the plurality of object proposals, wherein the first detection result is generated based on the region of interest pooling, and wherein the partial inference path bypasses the later feature generation and generation of the plurality of object proposals.

Example 12 includes the semiconductor apparatus of Example 7, wherein the first detection result is to include one or more object class bounding boxes.

Example 13 includes the semiconductor apparatus of Example 7, wherein the logic coupled to the one or more substrates includes transistor channel regions that are positioned within the one or more substrates.

Example 14 includes at least one computer readable storage medium comprising a set of instructions, which when executed by a computing system, cause the computing system to generate, by a full inference path of a neural network, a first detection result associated with one or more objects in a first video frame, detect a second video frame that is subsequent to the first video frame, and generate, by a partial inference path of the neural network, a second detection result based on the first detection result, wherein the second detection result corresponds to the second video frame.

Example 15 includes the computer readable storage medium of Example 14, wherein the instructions, when executed, cause the computing system to conduct an early feature generation based on the second video frame, conduct a region of interest pooling based on an output of the early feature generation, wherein the second detection result is generated based on the region of interest pooling.

Example 16 includes the computer readable storage medium of Example 14, wherein the second detection result is to include one or more objectness bounding boxes.

Example 17 includes the computer readable storage medium of any one of Examples 14 to 16, wherein the instructions, when executed, cause the computing system to repeat generation of the second detection result for a tunable plurality of video frames that are subsequent to the first video frame.

Example 18 includes the computer readable storage medium of Example 14, wherein the instructions, when executed, cause the computing system to conduct an early feature generation based on the first video frame, conduct a later feature generation based on an output of the early feature generation, generate a plurality of object proposals based on an output of the later feature generation, conduct a region of interest pooling based on the output of the later feature generation and the plurality of object proposals, wherein the first detection result is generated based on the region of interest pooling, and wherein the partial inference path bypasses the later feature generation and generation of the plurality of object proposals.

Example 19 includes the computer readable storage medium of Example 14, wherein the first detection result is to include one or more object class bounding boxes.

Example 20 includes a method comprising generating, by a full inference path of a neural network, a first detection result associated with one or more objects in a first video frame, detecting a second video frame that is subsequent to the first video frame, generating, by a partial inference path of the neural network, a second detection result based on the first detection result, wherein the second detection result corresponds to the second video frame.

Example 21 includes the method of Example 20, wherein generating the second detection result includes conducting an early feature generation based on the second video frame, conducting a region of interest pooling based on an output of the early feature generation, wherein the second detection result is generated based on the region of interest pooling.

Example 22 includes the method of Example 20, wherein the second detection result includes one or more objectness bounding boxes.

Example 23 includes the method of any one of Examples 20 to 22, further including repeating generation of the second detection result for a tunable plurality of video frames that are subsequent to the first video frame.

Example 24 includes the method of Example 20, wherein generating the first detection result includes conducting an early feature generation based on the first video frame, conducting a later feature generation based on an output of the early feature generation, generating a plurality of object proposals based on an output of the later feature generation, conducting a region of interest pooling based on the output of the later feature generation and the plurality of object proposals, wherein the first detection result is generated based on the region of interest pooling, and wherein the partial inference path bypasses the later feature generation and generation of the plurality of object proposals.

Example 25 includes the method of Example 20, wherein the first detection result includes one or more object class bounding boxes.

Thus, technology described herein may reduce the computational cost of general object detection for videos having high-frame rates. The technology can improve object detection performance while minimizing the required computational cost. Object detection may therefore be used as a fundamental building block for any CNN-based object detection algorithm design in surveillance and security, retail, industry, and smart home markets.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a network controller to receive a first video frame and a second video frame that is subsequent to the first video frame;
a processor coupled to the network controller; and
a memory coupled to the processor, wherein the memory includes a set of instructions, which when executed by the processor, cause the computing system to:
generate, by a full inference path of a neural network, a first detection result associated with one or more objects in the first video frame, wherein the full inference path includes a plurality of layers that generates the first detection result,
detect the second video frame, and
generate, by a partial inference path of the neural network that is to bypass one or more layers of the full inference path, a second detection result based on the first detection result, wherein the second detection result corresponds to the second video frame.

2. The computing system of claim 1, wherein the instructions, when executed, cause the computing system to:
conduct an early feature generation based on the second video frame; and
conduct a region of interest pooling based on an output of the early feature generation, wherein the second detection result is generated based on the region of interest pooling.

3. The computing system of claim 1, wherein the second detection result is to include one or more objectness bounding boxes.

4. The computing system of claim 1, wherein the instructions, when executed, cause the computing system to repeat generation of the second detection result for a tunable plurality of video frames that are subsequent to the first video frame.

5. The computing system of claim 1, wherein the instructions, when executed, cause the computing system to:
conduct, with an early feature layer of the plurality of layers, an early feature generation based on the first video frame;
conduct, with a later feature layer of the plurality of layers, a later feature generation based on an output of the early feature layer;
generate, with a region proposal layer of the plurality of layers, a plurality of object proposals based on an output of the later feature layer; and
conduct, with a region of interest pooling layer of the plurality of layers, a region of interest pooling to generate a region of interest pooling output based on the output of the later feature layer and the plurality of object proposals, wherein the first detection result is generated based on the region of interest pooling output, further wherein the partial inference path bypasses the later feature layer and the region proposal layer, and further wherein the first detection result includes object class bounding boxes.

6. The computing system of claim 1, wherein the first detection result is to include one or more object class bounding boxes.

7. A semiconductor apparatus comprising:

one or more substrates; and logic coupled to the one or more substrates, wherein the logic is implemented at least partly in one or more of configurable logic or fixed-functionality hardware logic, the logic coupled to the one or more substrates to:

generate, by a full inference path of a neural network, a first detection result associated with one or more objects in a first video frame, wherein the full inference path includes a plurality of layers that generates the first detection result;

detect a second video frame that is subsequent to the first video frame; and generate, by a partial inference path of the neural network that is to bypass one or more layers of the full inference path, a second detection result based on the first detection result, wherein the second detection result corresponds to the second video frame.

8. The semiconductor apparatus of claim 7, wherein the logic coupled to the one or more substrates is to:

conduct an early feature generation based on the second video frame; and conduct a region of interest pooling based on an output of the early feature generation, wherein the second detection result is generated based on the region of interest pooling.

9. The semiconductor apparatus of claim 7, wherein the second detection result is to include one or more objectness bounding boxes.

10. The semiconductor apparatus of claim 7, wherein the logic coupled to the one or more substrates is to repeat generation of the second detection result for a tunable plurality of video frames that are subsequent to the first video frame.

11. The semiconductor apparatus of claim 7, wherein the logic coupled to the one or more substrates is to:

conduct, with an early feature layer of the plurality of layers, an early feature generation based on the first video frame;

conduct, with a later feature layer of the plurality of layers, a later feature generation based on an output of the early feature layer;

generate, with a region proposal layer of the plurality of layers, a plurality of object proposals based on an output of the later feature layer; and conduct, with a region of interest pooling layer of the plurality of layers, a region of interest pooling to generate a region of interest pooling output based on the output of the later feature layer and the plurality of object proposals, wherein the first detection result is generated based on the region of interest pooling output, further wherein the partial inference path bypasses the later feature layer and the region proposal layer, and further wherein the first detection result includes object class bounding boxes.

12. The semiconductor apparatus of claim 7, wherein the first detection result is to include one or more object class bounding boxes.

13. The semiconductor apparatus of claim 7, wherein the logic coupled to the one or more substrates includes transistor channel regions that are positioned within the one or more substrates.

14. At least one non-transitory computer readable storage medium comprising a set of instructions, which when executed by a computing system, cause the computing system to:

generate, by a full inference path of a neural network, a first detection result associated with one or more objects in a first video frame, wherein the full inference path includes a plurality of layers that generates the first detection result;

detect a second video frame that is subsequent to the first video frame; and generate, by a partial inference path of the neural network that is to bypass one or more layers of the full inference path, a second detection result based on the first detection result, wherein the second detection result corresponds to the second video frame.

15. The non-transitory computer readable storage medium of claim 14, wherein the instructions, when executed, cause the computing system to:

conduct an early feature generation based on the second video frame; and conduct a region of interest pooling based on an output of the early feature generation, wherein the second detection result is generated based on the region of interest pooling.

16. The non-transitory computer readable storage medium of claim 14, wherein the second detection result is to include one or more objectness bounding boxes.

17. The non-transitory computer readable storage medium of claim 14, wherein the instructions, when executed, cause the computing system to repeat generation of the second detection result for a tunable plurality of video frames that are subsequent to the first video frame.

18. The non-transitory computer readable storage medium of claim 14, wherein the instructions, when executed, cause the computing system to:

conduct, with an early feature layer of the plurality of layers, an early feature generation based on the first video frame;

conduct, with a later feature layer of the plurality of layers, a later feature generation based on an output of the early feature layer;

generate, with a region proposal layer of the plurality of layers, a plurality of object proposals based on an output of the later feature layer; and conduct, with a region of interest pooling layer of the plurality of layers, a region of interest pooling to generate a region of interest pooling output based on the output of the later feature layer and the plurality of object proposals, wherein the first detection result is generated based on the region of interest pooling output, further wherein the partial inference path bypasses the later feature layer and the region proposal layer, and further wherein the first detection result includes object class bounding boxes.

19. The non-transitory computer readable storage medium of claim 14, wherein the first detection result is to include one or more object class bounding boxes.

20. A method comprising:
generating, by a full inference path of a neural network, a first detection result associated with one or more objects in a first video frame, wherein the full inference path includes a plurality of layers that generates the first detection result;
detecting a second video frame that is subsequent to the first video frame; and
generating, by a partial inference path of the neural network that bypasses one or more layers of the full inference path, a second detection result based on the first detection result, wherein the second detection result corresponds to the second video frame.

21. The method of claim 20, wherein generating the second detection result includes:
conducting an early feature generation based on the second video frame; and
conducting a region of interest pooling based on an output of the early feature generation, wherein the second detection result is generated based on the region of interest pooling.

22. The method of claim 20, wherein the second detection result includes one or more objectness bounding boxes.

23. The method of claim 20, further including repeating generation of the second detection result for a tunable plurality of video frames that are subsequent to the first video frame.

24. The method of claim 20, wherein generating the first detection result includes:
conducting, with an early feature layer of the plurality of layers, an early feature generation based on the first video frame;
conducting, with a later feature layer of the plurality of layers, a later feature generation based on an output of the early feature layer;
generating, with a region proposal layer of the plurality of layers, a plurality of object proposals based on an output of the later feature layer; and
conducting, with a region of interest pooling layer of the plurality of layers, a region of interest pooling to generate a region of interest pooling output based on the output of the later feature layer and the plurality of object proposals,
wherein the first detection result is generated based on the region of interest pooling output,
further wherein the partial inference path bypasses the later feature layer and the region proposal layer, and
further wherein the first detection result includes object class bounding boxes.

25. The method of claim 20, wherein the first detection result includes one or more object class bounding boxes.

* * * * *